Figure 1:
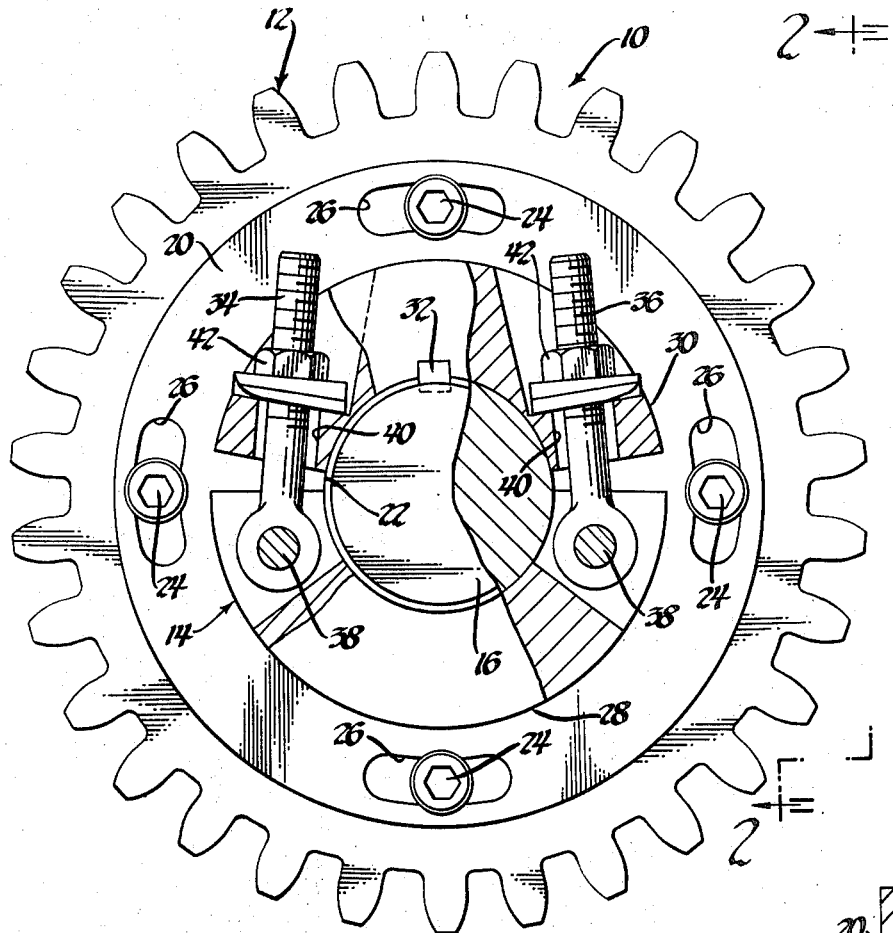

United States Patent [19]
Cutter

[11] 3,789,687
[45] Feb. 5, 1974

[54] SPROCKET ASSEMBLY

[75] Inventor: Delbert M. Cutter, Swartz Creek, Mich.

[73] Assignee: General Motors Corporation, Detroit, Mich.

[22] Filed: Nov. 20, 1972

[21] Appl. No.: 308,240

[52] U.S. Cl............................ 74/243 DR, 74/395
[51] Int. Cl...................... F16h 55/12, F16h 55/52
[58] Field of Search............ 74/243 DR, 243 R, 395

[56] References Cited
UNITED STATES PATENTS

| | | |
|---|---|---|
| 2,382,740 | 8/1945 | Noffsinger...................... 74/243 DR |
| 3,490,303 | 1/1970 | Rosenberg............................ 74/395 |
| 946,735 | 1/1910 | Richards........................... 74/243 R |
| 1,578,983 | 3/1926 | Gossett........................... 74/243 DR |

Primary Examiner—Benjamin W. Wyche
Assistant Examiner—Allan Russell Burke
Attorney, Agent, or Firm—Edward J. Biskup

[57] ABSTRACT

A sprocket assembly having a two-piece hub supporting a sprocket wheel on a shaft. One part of the hub is circumferentially spaced from the other and both hub parts are interconnected by a pair of threaded studs each of which is pivotally supported at one end and carries a nut at the other end for adjusting the angular position of the sprocket wheel relative to the shaft.

2 Claims, 2 Drawing Figures

SPROCKET ASSEMBLY

This invention concerns a sprocket assembly for use with sprocket chains and more particularly concerns an improved hub design for mounting a sprocket wheel on a shaft so as to provide adjustable positioning of the sprocket wheel relative to the shaft. In the preferred form, the sprocket assembly according to the invention includes a two-piece support member which serves to support the sprocket wheel in a rotatable shaft. One part of the support member includes a disc-shaped member which is centrally formed with an opening for accommodating the shaft. A semi-cylindrical hub section is integrally formed with and projects from one face of the disc-shaped member and is positioned adjacent to and concentric with the opening formed therein. The other part of the support member consists of a separate hub section which is adapted to be keyed to the shaft opposite the semi-cylindrical hub section. A pair of threaded studs are pivotally carried by one of the hub sections and are adapted to be located on opposite sides of the shaft with the threaded end of each of the studs passing through an enlarged aperture formed in the other hub section. Appropriate nuts are threadably carried by each of the studs so that a loosening of one nut and a tightening of the other nut results in an angular adjustment of the disc-shaped member relative to the shaft to thereby provide for proper positioning of the sprocket wheel about the rotational axis of the shaft.

As an additional feature, the disc-shaped member described above is provided with a plurality of circumferentially spaced slots located on a circle having its center at the rotational axis of the shaft. Each slot accommodates a screw which is threaded into and supports the sprocket wheel on the outer face of the disc-shaped member. Loosening of the screws permits the sprocket wheel to be angularly adjusted in position in a manner similar to that provided by the split hub arrangement except that the increment of adjustment is greater. Thus, the screw-slot combination can be used for rough adjustment while the split-hub arrangement can be used for fine adjustment of the sprocket wheel.

The objects of the present invention are to provide a sprocket assembly having a split hub arrangement which permits the sprocket wheel to be angularly adjusted about a support shaft; to provide a two-piece hub for supporting a sprocket wheel and in which the hub sections are circumferentially spaced from each other and interconnected by pivoted threaded studs which carry nuts for adjusting the angular position of the sprocket wheel relative to the support shaft; to provide a hub design for a sprocket wheel in which the hub is divided into two parts with one of the parts being keyed to the support shaft and connected to the other part through adjustment means which serve to position the sprocket wheel relative to the support shaft; and to provide a sprocket assembly having a sprocket wheel mounted on a disc-shaped member which carries means for providing both rough and fine adjustment of the sprocket wheel about the support shaft.

Figure 2:
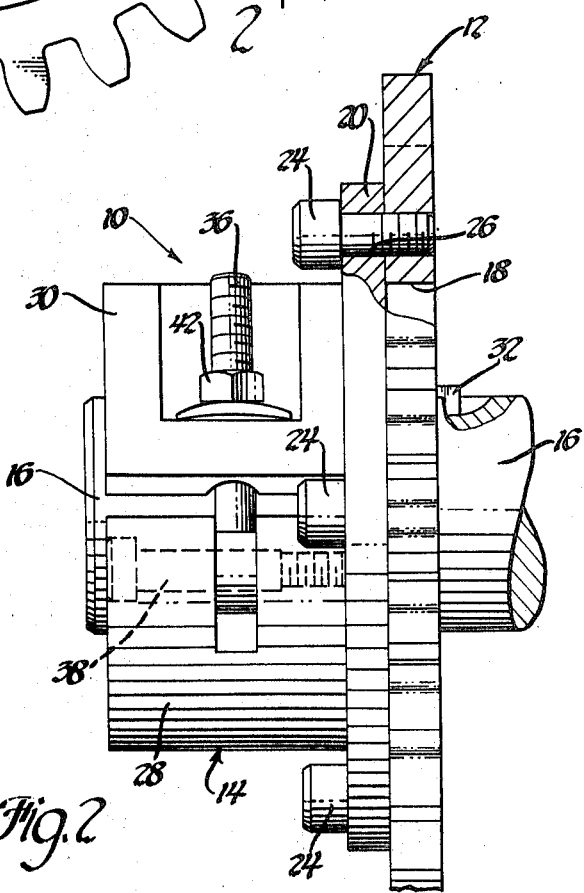

Other objects and features of the present invention will be apparent from the following detailed description when taken with the drawings in which:

FIG. 1 is a front elevational view showing a sprocket assembly made according to the invention and mounted on a support shaft; and FIG. 2 is a side view of the sprocket assembly taken on line 2—2 of FIG. 1.

Referring to the drawings and more particularly FIG. 1 thereof, a chain sprocket assembly 10 made according to the invention is shown comprising a sprocket wheel 12 and a two-part support member 14 which serves to mount the sprocket wheel 12 on a rotatable shaft 16.

More specifically, the sprocket wheel 12 is a separate member which is formed with a plurality of identical and equally spaced sprocket teeth along the periphery thereof and includes an enlarged concentric circular opening 18 as seen in FIG. 2. The sprocket wheel 12 is supported on the outer face of a disc-shaped member 20 having a circular opening 22 centrally formed therein of a diameter which is equal to the diameter of the shaft 16. The sprocket wheel 12 is supported on the disc-shaped member 20 by four identical screws 24 each of which extends through a slot 26 formed in the disc-shaped member 20. The slots 26 are located along a circle having its center at the center point of the shaft 16. Thus by loosening the screws 24, the sprocket wheel 12 can by angularly positioned relative to the disc-shaped member 20.

The disc-shaped member 20 also has a semi-cylindrical hub section 28 integrally formed therewith that projects from the inner face thereof. The hub section 28 is positioned adjacent to the opening 22 and has a curved surface axially aligned therewith so as to circumferentially mate with the outer surface of the shaft as seen in FIGS. 1 and 2. Located above the hub section 28 is another hub section 30 which is fixed with the shaft 16 by an elongated key 32. Both of the hub sections 28 and 30 are interconnected by a pair of identical threaded stud members 34 ane 36 each of which has the lower end thereof pivotally connected to the hub section 28 by a screw 38. The threaded or upper end of each of the stud members is accommodated by an enlarged aperture 40 formed in the hub section 30 and carries a pair of tapered washers and a nut 42. accordingly, by loosening one of the nuts 42 and tightening the other, fine angular adjustment of the disc-shaped member 20 together with the secured sprocket wheel 12 can be obtained relative to the shaft 16.

From the above description, it should be apparent that the sprocket assembly described above permits the sprocket wheel 12 to be angularly adjusted relative to the shaft 16 through two adjustment arrangements. In other words, the screws 24 permit the sprocket wheel to be roughly adjusted in position while the stud and nut combinations permit fine adjustment of the sprocket wheel 12 relative to the shaft 16.

Various modifications and changes in the above-described construction can be made without departing from the spirit of the invention. It should be understood that such changes and modifications are contemplated by the inventor and therefore he does not wish to be limited except by the scope of the appended claims.

I claim:

1. A sprocket assembly having a sprocket wheel adapted to be mounted on a rotatable shaft comprising, a two-part support member for the sprocket wheel, one of the parts of the two-part support member including a disc-shaped member centrally formed with an opening for accommodating said shaft, a first hub section integrally formed with the disc-shaped member and projecting from one surface thereof for mating engagement with a portion of said shaft, a second hub section circumferentially spaced from the first hub section for engaging another portion of said shaft and adapted to be keyed to said shaft opposite to said first hub section, a pair of threaded studs carried by said hub sections and adapted to be located on opposite sides of said shaft, each of said studs having one end thereof pivotally connected to one of the hub sections and having the other end extending through an enlarged aperture formed in the other hub section, and a nut threadably carried by each of said studs at the free end thereof so that loosening of one nut and tightening of the other nut angularly moves the disc-shaped member relative to the second hub section and thereby adjusts the position of the sprocket wheel relative to the shaft.

2. A sprocket assembly adapted to be mounted on a rotatable shaft and including a sprocket wheel, said sprocket assembly comprising a disc-shaped member centrally formed with an opening for accommodating said shaft, said disc-shaped member having a pluaritity of slots formed therein, said slots being circumferentially spaced and located along a circle having its center at the center point of said opening, a screw extending through each slot and being threaded into said sprocket wheel for rigidly connecting the latter to one face of said disc-shaped member and permitting angular movement of the sprocket wheel relative to the disc-shaped member when all of the screws are loosened, a first hub section integrally formed with the disc-shaped member and projecting from the other face thereof for mating engagement with a portion of said shaft, a second hub section circumferentially spaced from the first hub section for engaging another portion of said shaft and adapted to be keyed to said shaft opposite to said first hub section, a pair of threaded studs carried by said hub sections and adapted to be located on opposite sides of said shaft, each of said studs having one end thereof pivotally connected to one of the hub sections and having the other end extending through an enlarged aperture formed in the other hub section, and a nut threadably carried by each of said studs at the free end thereof so that loosening of one nut and tightening of the other nut causes angular movement of the disc-shaped member relative to the second hub section and thereby adjusts the position of the sprocket wheel relative to the shaft.

* * * * *